United States Patent
Perrin

[11] 3,765,995
[45] Oct. 16, 1973

[54] FLOWER BOWLS
[76] Inventor: Jean Baptiste Perrin, 1, passage Gastaud, Nice, France
[22] Filed: Jan. 25, 1971
[21] Appl. No.: 109,228

[30] Foreign Application Priority Data
  Sept. 2, 1970  France .............................. 7032501

[52] U.S. Cl................. 161/18, 47/41.13, 206/45.34
[51] Int. Cl. ............................................. A47g 7/00
[58] Field of Search .................... 47/41, 41.13, 41.4;
  161/13, 14, 16, 17, 18, 27; 215/95, 96;
  401/126, 128, 129; 206/45, 34

[56] References Cited
UNITED STATES PATENTS

| | | | |
|---|---|---|---|
| 2,601,658 | 6/1952 | Bussert | 161/18 X |
| 2,639,552 | 5/1953 | Tredup | 161/18 X |
| 2,686,642 | 8/1954 | Dobarganes et al. | 47/41.4 X |
| 1,455,158 | 5/1923 | Woodruff | 401/129 |
| 2,784,529 | 3/1957 | Prestigiacomo | 161/16 X |
| 1,063,484 | 6/1913 | Weismantel | 401/102 |
| 1,681,040 | 8/1928 | Kemp | 240/2 AD |
| 1,741,692 | 12/1929 | Garaja | 161/18 |
| 2,155,811 | 4/1939 | Tredup | 161/18 X |

FOREIGN PATENTS OR APPLICATIONS

| | | | |
|---|---|---|---|
| 1,268,424 | 6/1961 | France | 161/18 |
| 1,333,664 | 6/1963 | France | 161/18 |
| 560,412 | 7/1923 | France | 161/18 |

Primary Examiner—George F. Lesmes
Assistant Examiner—Henry F. Epstein
Attorney—McGlew and Toren

[57] ABSTRACT

A flower bowl constituted by a water-filled globe containing a flower and the refilling of which is obtained through normally closed openings formed in its covering plate, the fluidtightness of which latter is ensured by a rubber annulus provided with a depending lug and with an inner peripheral rib fitted within the gap between the covering plate and the cooperating edge of the opening in the globe.

5 Claims, 6 Drawing Figures

Patented Oct. 16, 1973 3,765,995

INVENTOR
JEAN BAPTISTE PERRIN

By
McGlew & Toren

Patented Oct. 16, 1973 3,765,995

INVENTOR
JEAN BAPTISTE PERRIN

By McGlew+Toren

FLOWER BOWLS

The so-called flower bowls form an ornamental device constituted by a large hollow glass inside which a flower is housed and which is filled with water so as to act after the manner of a magnifying glass whereby said flower appears as being much larger than it actually is and seems to fill substantially the entirety of the inner capacity of the globe. In fact, any person looking at a flower assuming such a large and brilliant appearance within the bowl receives a surprising aesthetic impression, provided however he does not ascertain that the globe is filled with water and for this reason it is essential that no residual volume of air may remain inside the globe.

Now, with the flower bowls presently on the market, it is very difficult to satisfy such a condition. As a matter of fact, in all prior flower bowls, the glass globe is provided with a broad opening bounded by an outwardly bent edge closed by a rigid or semi-rigid closing plate urged into contact with the edge of said opening by an elastic annulus constituted by a cylindrical rubber ring the diameter of which is substantially smaller than that of the opening, said ring being drawn out diametrically so that it may ride over the peripheries of the closing plate and of the edge of the opening in the glass globe after which the ring is released so that its edges are folded back over said plate and edge and form therewith a fluidtight packing. Said operation ensuring the fluidtight closing of the globe which has been previously completely filled with water cannot be executed readily without any water leaking out. In other words, it is difficult not to leave some air underneath the closing plate and when the bowl is subsequently turned upside down with the opening in the globe facing outwardly, said air will form in the upper part of the bowl a more or less large bubble which detrimentally jeopardizes the aesthetic appearance of the bowl and betrays the presence of water inside the globe.

Now, according to my invention, this defect and these difficulties are removed by providing in the closing plate one or more small holes through which it is possible to introduce water to complete the filling of the bowl without it being necessary to remove the rubber ring and to reinsert it in position, said holes in the closing plate being readily closed thenafter by means of conventional stoppers made of plastics.

Furthermore, even if at the start no air bubble is left in the upper part of the bowl in its finished condition, the unavoidable lack of fluidtightness in the closure allows water to leak out dropwise which is not only inconvenient for the surface on which the bowl is laid, but leads also to a reentrance of air collecting in the upper part of the bowl, whereby the desired appearance as in the case of conventional bowls is no longer obtained.

Now, by reason of the method of producing the glass globes forming the bowls, the edge of the opening in the bowl is generally not perfectly flat and shows unevenesses such as projections and recesses and the closing plate may also show some unevenesses. Consequently, in practice, the joining between the globe and the closing plate is never perfectly fluidtight and also, since the handling of the rubber ring during the closing operation is a delicate matter, its joining over the plate and over the edge of the opening in the globe is generally insufficiently fluidtight.

On the other hand, in the flower bowls presently on the market, the elastic annulus is constituted by mere cylindrical sections obtained by dividing a rubber tube by a succession of cuts perpendicular to the axis of the tube. Now, the rubber tube has been sujected during its vulcanisation to deformations and its diameter and thickness have been modified to varying extents in the different portions of its length and consequently the annuli obtained are somewhat different from one another and this leads firstly to losses by reason of the discarding of those sections which differ too much from the predetermined size and, furthermore, the unevenesses of the annuli used for the fluidtight closing of the bowl lead to defective fluidtightness.

In order to cut out these different drawbacks, I resort in accordance to the invention, for the formation of the annuli, to individually moulded rings which all show accurately the same size, shape and thickness. Said rings are provided towards the middle of their length with a short inner peripheral rib which is fitted, when the annulus is in position, between the edge of the opening in the globe and the closing plate so as to form a fluidtight packing. Lastly and in order to further the handling of the annulus when it is desired to remove and reinsert it, it is provided at one or more points of the periphery of its lower edge which is to be folded underneath the closing plate with a lug or tongue forming an extension of the wall of the annulus and which may be readily grasped when said edge is to be folded back over the outer surface of the plate.

The accompanying drawings illustrate by way of example a preferred embodiment of the flower bowl according to my invention. In said drawings.

Figure 1:
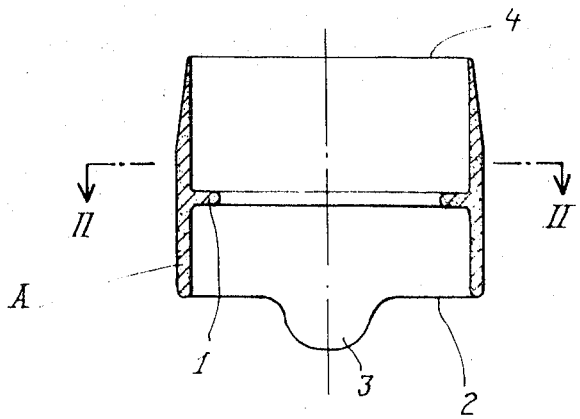
FIG. 1 is an axial cross-section of the moulded elastic ring.
Figure 2:
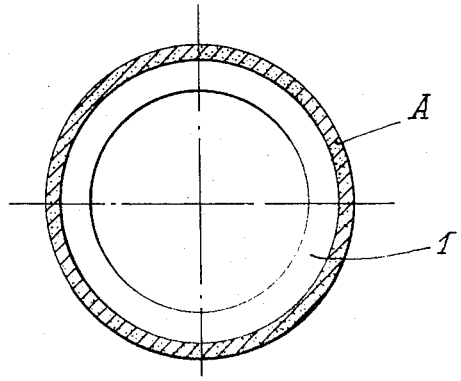
FIG. 2 is a cross-section through line II—II of FIG. 1.
Figure 3:
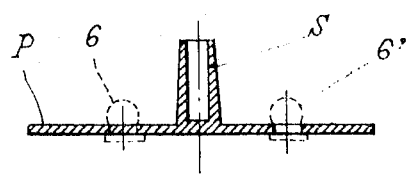
FIGS. 3 and 4 are an axial cross-section and a view from above of the closing plate.
Figure 4:
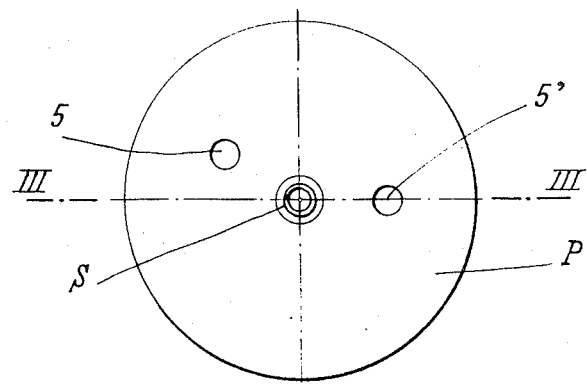

As illustrated in FIGS. 1 and 2, it is apparent that the elastic annulus A is provided approximately at midheight with an inner peripheral rib 1 and along its lower edge 2 with a tongue 3 forming a downwardly directed extension of its wall, whereas the upper portion of the annulus tapers upwardly towards its edge 4 so as to mate more reliably the uneven outer surface of the edge R of the opening at the lower end of the globe B. The closing plate P carries, as illustrated in FIGS. 3 and 4, the usual flower holder S in which the stem of the flower is to be inserted and it is provided with two openings 5 and 5' which are normally closed by stoppers 6, 6'.

Figure 5:
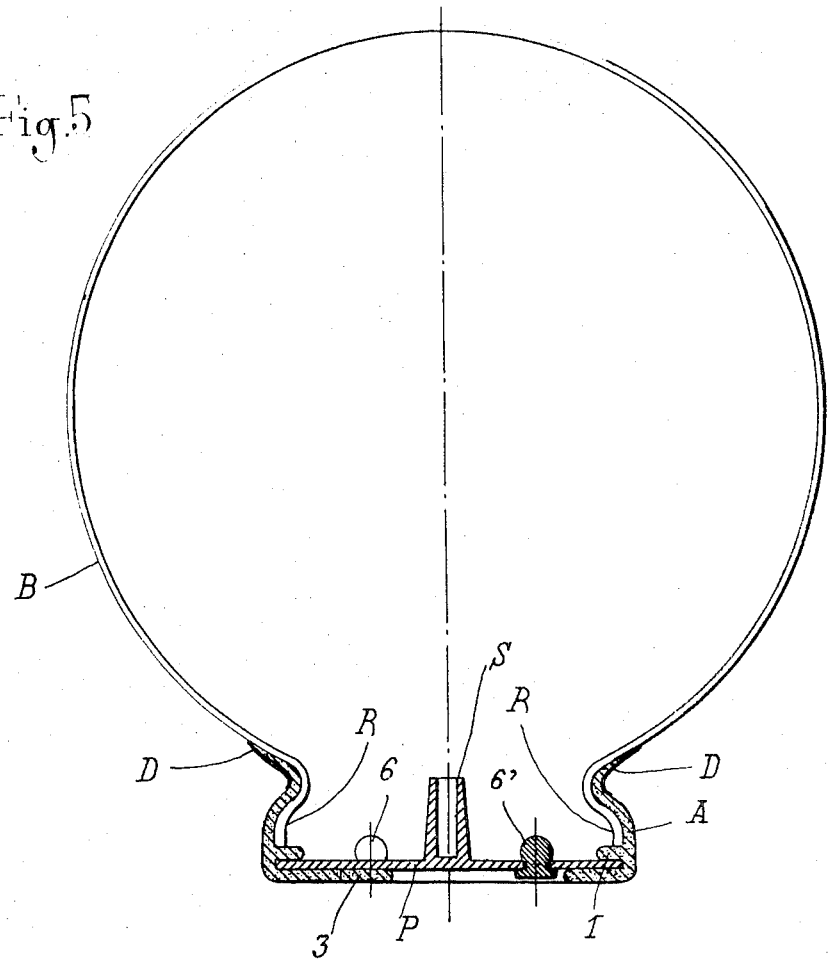
FIG. 5 is an axial cross-section of the assembled bowl in its displayed condition.
Figure 6:
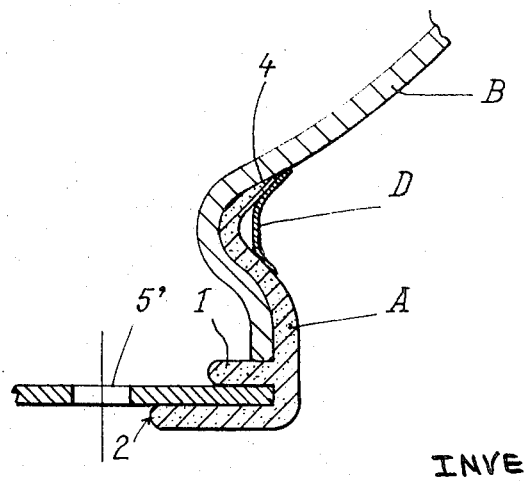
FIG. 6 illustrates cross-sectionally a detail on a larger scale.

FIG. 5 shows the bowl in its assembled condition. It is apparent that the annulus A should be first drawn out along a diameter and, when sufficiently extended, it is laid along the superposed peripheries of the closing plate P and of the edge R of the globe in a manner such that the rib 1 is inserted between said plate and said edge and forms a fluidtight packing therewith. When the annulus is released, its tapering upper portion engages the outer surface of the edge R while its lower portion including the tongue 3 is folded back over the outer surface of the plate P. It may be of advantage to urge the tapering edge 4 of the ring over the glass surface by resorting to an adhesive strip D.

I claim:

1. A flower display device comprising a globe having a lower neck portion terminating in a rim with a main central opening, an elastic tubular member having a central interior inwardly projecting sealing rib and being engaged with one end over said neck portion up to its said sealing rib, said sealing rib being elastically engaged over said rim, a covering plate engaged over said sealing rib and having at least one refill opening, stopper means closing the refill opening, said cover plate having a flower-holding portion disposed within the main opening and within the sealing rib for holding a flower so that it projects into said bowl, the opposite end of said tubular member being elastically flattened against the exterior of said covering plate and holding said covering plate in sealing engagement with said sealing rib.

2. A flower display device, according to claim 1, wherein said flower holding portion comprises a cylindrical inward extension of said plate with an opening at the end extending into said bowl.

3. A flower display device, according to claim 1, wherein said at least one refill opening comprises two openings defined through said plate, said stopper means comprising an elastic stopper for closing each of said refill openings.

4. A flower display device, according to claim 1, including a tongue projecting from the lower edge of said elastic member which is flattened against said covering plate and which is engageable in order to facilitate removal of said plate.

5. A flower display device, according to claim 4, wherein said elastic tubular member comprises an upper end which engages over the neck of said bowl and which tapers inwardly toward the upper edge at the location in which said upper edge engages the neck of said bowl, the opposite lower end having a tongue portion which projects outwardly and is rounded and which lies flat against said covering plate.

* * * * *